United States Patent [19]

Stewart

[11] 4,015,087
[45] Mar. 29, 1977

[54] SPECTROGRAPH APPARATUS FOR ANALYZING AND DISPLAYING SPEECH SIGNALS

[75] Inventor: Leslie C. Stewart, Rochester, N.Y.

[73] Assignee: Center for Communications Research, Inc., Rochester, N.Y.

[22] Filed: Nov. 18, 1975

[21] Appl. No.: 633,142

[52] U.S. Cl. .................. 179/1 SP; 324/77 B; 178/DIG. 24
[51] Int. Cl.² .................................. G10L 1/14
[58] Field of Search ............ 179/1 SA, 1 SP; 324/77 R, 77 B, 77 CS; 340/324 D; 178/DIG. 24

[56] References Cited

UNITED STATES PATENTS

| | | | |
|---|---|---|---|
| 3,263,169 | 7/1966 | Remley | 324/77 C |
| 3,617,883 | 11/1971 | Richman | 324/77 C |
| 3,723,652 | 3/1973 | Alles et al. | 179/1 SP |
| 3,925,602 | 12/1975 | Wood et al. | 178/DIG. 24 |

*Primary Examiner*—Kathleen H. Claffy
*Assistant Examiner*—E. S. Kemeny
*Attorney, Agent, or Firm*—Martin Lu Kacher

[57] ABSTRACT

Apparatus which provides a real time sound spectrogram of signals such as speech which are complex in their frequency content and also vary rapidly in time, is described. A visual display device such as a scan converter and video monitor is provided which receives, in short time segments, signals from a time compression heterodyne type spectrum analyzer and displays these segments on a raster. Display control circuits generate a vertical sweep signal and fast and slow horizontal sweep signals in synchronism with the short time segments. Successive spectrums are plotted and displayed under the control of the fast horizontal sweep and the vertical sweep while the spectrogram, as of an entire speech utterance, is made up of successive spectrums during the interval of the slow horizontal sweep. Thus a sound spectrogram of each short time interval is produced; there being only a short delay after utterance of the sound before the result appears on the display. The intensity of each frequency in the spectrum during each time segment and over each spectrum (viz., each piece of the spectrogram) is plotted in real time as the speech utterance is produced. The pieces are concatenated such that the perceptual effect is that of a continuous sound spectrogram which unfolds in real time. The frequency-time-intensity plot thus contains fine detail enabling the viewer to observe the characteristics of the speech utterance of interest such that the apparatus is especially suitable for use in speech training as to deaf students.

16 Claims, 5 Drawing Figures

SPECTROGRAPH APPARATUS FOR ANALYZING AND DISPLAYING SPEECH SIGNALS

The present invention relates to apparatus for the spectrum analysis of signals such as speech and the like and which displays a spectrogram of such input signals, and particularly to apparatus for generating and displaying a spectrogram of complex signals such as speech and the like as they are uttered or as they occur, in real time.

The invention is especially suitable for use in the training of speech and elocution to deaf persons. The invention however is also applicable for the analysis and observation of the frequency-time-intensity characteristics of sound signals, such as music and the outputs of various transducers such as hydrophones, geophones, vibration transducers and etc., for providing a spectrographic display thereof.

In an article appearing in Nature Magazine, Jan. 14, 1961, pps. 117 through 119, there is described a real time spectrum analyzer utilizing a digital time compressor and a heterodyne detector. The heterodyne detector output is blanked during the initial portion of the analysis of each frequency range which makes up a spectrum so as to suppress the effects of unwanted transients. The heterodyne detector output is averaged over each short time interval of window during which successive frequency steps of the signal are scanned by the heterodyne detector. The spectrums are concatenated. The display is generated with an oscilloscope on a film. However, the resolution or fine detail of the distribution of signal energy in the time domain is not displayed.

The distribution of signal energy with respect to both frequency and time contains significant information. In speech, the distribution with respect to time depicts the pitch characteristics and linguistic information of the speech utterance. In speech training, especially the training of deaf persons to speak, the fine detail of the distribution in the time domain is of special significance. It is a feature of this invention to provide spectrograph apparatus which visually displays not only the frequency characteristics of the speech or other input signal being analyzed, but also, continuously and in fine detail, the time variations in intensity of the spectrum, as the speech is uttered in real time.

The invention affords the means for spectrographic analysis which has heretofore been obtainable only with a tape loop spectrograph apparatus which is not capable of operating in real time, as for example has been described in W. Koenig, H. K. Dunn, and L. Y. Lacy, "The Sound Spectrograph," Volume 18, No. 1, July 1946, pps. 19–49. Various types of spectrographic analysis apparatus have also been heretofore disclosed. For a general background of the field, reference may be had to the following U.S. Pats. Nos.: 2,403,986; 2,938,079; 2,998,568; 3,243,703; 3,344,349; 3,548,305; 3,566,035; 3,581,192; 3,634,759; and 3,728,623.

The conventional sound spectrograph plots the rectified but unaveraged waveform from the bandpass analysis filter, there being a continuous time history of this waveform along the time axis at each frequency for which an analysis is performed. The time resolution is therefore limited only by the impulse response characteristic of the bandpass filter. In the present invention the waveform from the bandpass analysis filter is likewise rectified but unaveraged in deriving the sound spectrogram for each interval. When the intervals are concatenated, continuity of time over the interval junction is preserved. Thus, pitch periodicity or randomness of a speech signal can be readily observed as is the case with a conventional broad band spectrogram.

It is an object of this invention to provide improved apparatus for producing spectrograms of signals which may vary rapidly in time, such as speech and the like, which display the spectrums of such signals with fine resolution, without loss of detail, of the distribution of the signal energy thereof in the time domain as well as in the frequency domain.

It is another object of the invention to provide an improved system for the analysis of the spectrum of signals which have complex frequency distribution and which vary rapidly with respect to time, such as speech and the like, which apparatus derives and displays continuously and without loss of detail, the spectrogram of the signal without loss of resolution in each of the frequency, intensity and time domains.

It is a further object of the invention to provide improved apparatus for the analysis and display of the spectrum of complex signals, such as speech, in real time to provide a spectrogram wherein the distribution of energy of the signal in frequency is displayed continuously with respect to time so that the fine detail present in the spectrum, such as pitch and other periodic variations, will be shown in the spectrogram.

It is a still further object of the present invention to provide improved spectrograph display apparatus which is especially suitable for speech training purposes, particularly in the training of deaf students to speak.

Briefly described a spectrograph system embodying the invention produces a real time sound spectrogram of signals such as speech which are complex in their frequency content and also vary rapidly in time, and which displays the sound spectrogram on a visual display device. The signal is divided into short time intervals and a sound spectrogram of each interval is produced, there being only a short delay before the result appears. The intervals are concatenated such that the perceptual effect is that of a continuous sound spectrogram which unfolds in real time. Specifically, in accordance with an embodiment of the invention, a time compressor and a heterodyne detector are provided wherein successive segments of the signals to be analyzed, which contain redundant portions of such signals, are analyzed in a plurality of successively higher frequency ranges over the frequency band of interest. A visual display device, preferably a scan converter and a video monitor which receives signals from the scan converter, displays the spectrogram. A display control generates a plurality of sweep signals synchronously with the time compressed segments as they are analyzed in the heterodyne detector. The sweep signals consist of fast horizontal sweep signals which are concurrent with and of the same duration as the signal segments being analyzed; vertical sweep signals concurrent with and over the same interval as the plurality of segments which are analyzed to provide the spectrum over the frequency band of interest; and slow horizontal signals which are concurrent with and have a duration of the interval occupied by a plurality of successive vertical sweep signals. In order to provide a spectrogram which perceptually "unfolds" in real time on the visual display, the time duration of each interval spectrogram and the delay before that interval spectrogram appears on the display must be selected. This is accomplished by making the rate of fast sweep signals consonant with the interval spectrogram such that complete intervals are scanned and displayed with minimal delay and without flicker. If the duration of the interval spectrogram is too long, (on the order of 100 ms) then as the interval spectrograms appear there will be an annoying flicker effect due to the low frame rate (10 per second) at which each new interval spectrogram appears. Likewise if the delay due to processing time of the spectrum analyzer is too long (on the order of ½ sec.) then a person speaking into a microphone to produce the signals may be annoyed or missled by the delay between microphone signal and appearance of the transformed signal on the display. On the other hand, if the interval chosen or the processing delay is very short (on the order of 5 ms) the perceptual effect may be satisfactory but the spectrum analyzer circuitry will be operating very inefficiently (viz., at higher speed than is necessary for producing the desired display). The choice of suitable parameters (e.g., 16.7 ms interval, 25.5 ms average delay) is enabled by the invention. These sweep signals define a raster on the scan converter unit which stores the output of the heterodyne detector so as to preserve the intensity variations with time in each frequency segment making up the spectrogram. Reading and writing are alternately carried out by the scan converter unit such that the video monitor continuously displays the spectrogram in real time while preserving the fine detail and resolution of the energy distribution of the signal, not only in the frequency domain, but also in the time domain.

The foregoing and other features, objects and advantages of the invention as well as a preferred embodiment thereof will become more apparent from a reading of the following description in connection with the accompanying drawings in which.

Figure 1:
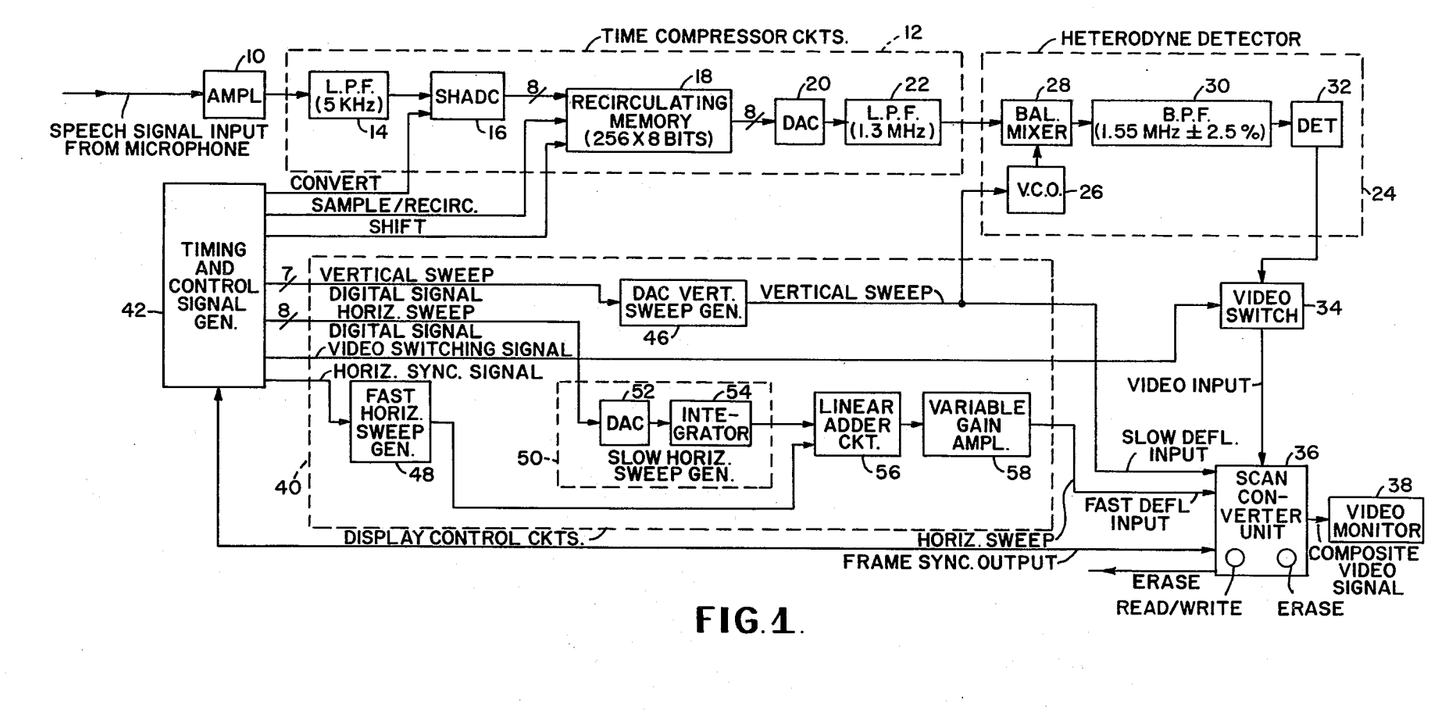
FIg. 1 is a block diagram of a real time sound spectrograph for the analysis and display of speech input signals, in accordance with a preferred embodiment of the invention.

Referring more particularly to FIG. 1, the speech input signals as may be obtained from a microphone are amplified in an amplifier 10 and applied to time compressor circuits 12. These circuits 12 include an input low pass filter (L.P.F.)14 which band limits the speech signal to the band of interest (viz., 0 to 5 KHz). A sample and hold and analog to digital converter (SHADC) 16 digitizes the speech and applies the samples, which are in the form of multi-bit digital words, eight bits being suitable, to a recirculating memory 18.

The memory 18 may suitably consist of eight binary shift registers, one register for each bit, with gates for recirculating the bits from the output of the registers back to the inputs thereof. The registers are of sufficient length to hold a time compressed segment of the signal in memory for a period longer than the time interval during which a frequency range of the spectrum is analyzed. This latter time interval is hereafter called the measurement interval.

The length of the memory 18 may suitably be 256 bits and the bits may be shifted through the memory at a 2.662 MHz rate. The speech signals are converted by the SHADC once each recirculation of the memory and shortly after conversion sampled and inputted to the memory. The new eight-bit digital signal sample displacing the older sample in memory. The memory length, recirculation rate, sampling and conversion rates, are a function of the number of frequency ranges which it is desired to analyze in real time as well as the rate of operation of the display device which is used in the system. It will be appreciated therefore that the rates and memory lengths and other specific numerical values are exemplary only and that other rates, lengths and numerical values may be used, if desired.

The digital signal in the memory 18 is reconverted into analog form by a digital to analog converter (DAC) 20. A low pass filter 22 smooths the analog signal from the digital to analog converter 20. Inasmuch as each digital signal sample is circulated through the memory 256 times as fast as it is produced, the frequency spectrum is expanded by a factor of 256. The highest frequency range of interest is 5 KHz. Accordingly, the highest frequency of interest will be approximately 1.3 MHz which may be the cut-off frequency of the low pass filter 22.

The reconverted, time compressed analog waveform from the time compressor circuits 12 is applied to a heterodyne detector 24. The heterodyne detector includes a variable frequency oscillator which is indicated as a voltage controlled oscillator (V.C.O.) 26. A different, successively higher injection frequency for each of the steps of the frequency range in the spectrum to be analyzed and displayed are provided by the oscillator 26 to a balanced mixer 28 where these injections are mixed with the time compressed, frequency expanded input signal segments from the time compressor circuits 12. A bandpass filter (B.P.F.) 30 passes each of the successive frequency ranges of the spectrum. For example, the V.C.O. 26 is stepped in 85 steps, from 1.55 MHz to 2.85 MHz. The bandpass filter 30 has a bandpass of ±2.5% about a center frequency of 1.55 MHz, or a total bandpass of 77.5 KHz. This corresponds to a real time frequency of approximately 300 Hz (viz., 77.5 JHz + 256). The bandpass filter 30 thus extracts the lower sideband mixer products produced by the balanced mixer 28, the carrier being suppressed in the balanced mixer. The lowest step corresponds to a range from zero to approximately 150 Hz in frequency. The next step is approximately 60 Hz higher. The adjacent frequency ranges thus overlap, providing redundancy in the frequency dimension. It will also be observed, as the description proceeds, that the invention provides redundancy in the spectrum also in the time dimension, since adjacent time segments have a large number of redundant samples, while continuity of time over the interval junctions in each frequency range is preserved.

The output of the filter 30 may be applied to a detector 32 such as a rectifier which provides a unipolar video signal. The detector 32 is optional and the output signal provided directly from the filter 30 may be used as the video signal to plot the spectrum. The video signal varies in amplitude during the time segment over which each frequency range is analyzed. Thus the variations in amplitude in the video signal from the heterodyne detector 24 contain the information resulting from the spectral analysis along the time dimension or axis. It will be noted that this information is presented continuously and not averaged by utilizing as the video signal either the output of the bandpass filter 30 directly or the rectified filter output if the detector 32 is used.

A video switch 34 (such as an analog gate circuit) is operated by a switching signal in the form of a level which causes the switch 34 to be either enabled so as to pass the video signals or to be inhibited so as to block the video signals. In this manner only the time segments of the input signal which are free of transients, due to the impulse response of the filter 30, are used to provide the spectrograph display. In addition, th video switch 34 enables the video input to be blanked over certain intervals, such as a scan converter read interval, as will be hereinafter explained.

The video input is applied to a visual display device which is illustrated as a cathode ray tube device, specifically a scan converter unit 36 with its associated video (TV) monitor 38. A cathode ray oscilloscope, preferably of the type using a storage or long persistence cathode ray tube may also be used. The scan converter and video monitor are especially desirable since the display is continuously refreshed and may remain on the screen as long as desired. also spectrograms of the same utterance by the same or different speakers which are successfully produced may be plotted and displayed on the screen of the monitor 38 in side-by-side relationship. This is especially desirable for speech training purposes. The student can repeat the same utterance and visualize his mistakes or changes in his speech. Spectrograms of the teacher's voice followed by the student's voice can also be displayed and held on the screen. The scan converter unit may suitably be the model MSC-1 Scan Converter Unit manufactured by the Hughes Aircraft Company, Industrial Products Division, Oceanside, California. The video monitor may be a conventional television monitor which receives the composite video signal (including vertical and horizontal sync components) as the scan converter unit 36 is read out and generates a television picture on the screen of its cathode ray tube of the spectrograph.

Display control circuits 40 are used to generate a raster to write the spectrogram on the scan converter unit or to display the spectrogram on the screen of a cathode ray oscilloscope, if the oscilloscope is used instead of the scan converter unit 36 and video monitor 38. A timing and control signal generator 42 provides timing signals to the time compressor circuit as well as the timing and control signals to the display control circuits 40. The generator 42 also generates the video switching signal. A video switching signal may be obtained which inhibits the video switch during the read interval of the scan converter unit. A delay circuit (e.g., a delay line or one shot) may be used, if desired, to delay the video switching signal to accommodate for delays in the B.P.F. 30.

The display control circuits 40 contain a vertical sweep generator 46 in the form of a digital to analog converter (DAC). Vertical sweep digital signals from the timing and control signal generator 42 are translated by the DAC 46 into a staircase waveform each step of which corresponds to a successive one of the 85 frequency ranges mentioned above. This vertical sweep signal is applied to step the voltage controlled oscillator 26 in the heterodyne detector 24 and is also applied to the slow deflection input of the scan converter unit 36. In the event that an oscilloscope display is used, the vertical sweep is connected to the Y axis or vertical sweep input of the oscilloscope.

A fast horizontal sweep generator 48, suitably a ramp or sawtooth wave generator of the triggerable type, provides a fast horizontal sweep signal during the measurement interval (i.e., during each time segment that a frequency range of a spectrum is being analyzed). Since the duration of this sweep is equal to the interval of the time compressed signals, it is the highest frequency sweep signal generated by the display control circuits 40 and therefore is referred to as the fast horizontal sweep.

A slow horizontal sweep generator 50 in the display control circuit includes a second digital to analog converter (DAC) 52 which receives horizontal sweep digital signals from the timing and control signal generator 42. These horizontal sweep digital signals are incremented every alternate vertical sweep whether the scan converter unit 36 or an oscilloscope display is used. The output of the second digital to analog converter (DAC) 52 is a staircase waveform which is repetitive after a large number of spectrums are produced, so as to permit a plotting of a spectrogram several seconds in duration such that an entire speech utterance, e.g., a syllable or even a complete word or phrase, can be displayed.

The staircase waveform the DAC 52 may be integrated in an integrator circuit 54 such as an operational amplifier having a very long time constant capacitor feedback circuit. The integrator 54 is optional and the staircase waveform from the second converter 52 may be used directly as the slow horizontal sweep signal. The fast horizontal sweep signal and the slow horizontal sweep signal are summed together in a linear adder circuit 56. Preferably the amplitude of the fast horizontal sweep is adjusted relative to the amplitude of each step of the slow horizontal sweep so that they are equal to each other. The spectrum for successive time segments of the input signal will then be concatenated (plotted in side-by-side relationship) as will be explained more fully hereinafter in connection with FIG. 5. The composite horizontal sweep signal is adjusted in amplitude in a variable gain amplifier 58 and then applied to the fast deflection input of the scan converter unit 36. In the event that an oscilloscope display is used instead of the scan converter unit, the horizontal sweep is applied to the X axis or horizontal sweep input of the oscilloscope.

When the visual display consists of the scan converter unit 36 and its associated video monitor 38, it is desirable to synchronize the timing and control signal generator 42 and the timing circuits in the scan converter unit 36 with each other. The scan converter operates at the standard television frame sync rate of 60 Hz and provides a frame sync output repetitive at 60 Hz. This frame sync output is applied to the timing and control signal generator 42 and used in the generator 42 to synchronize the analyzer and display portions of the system.

Figure 2:
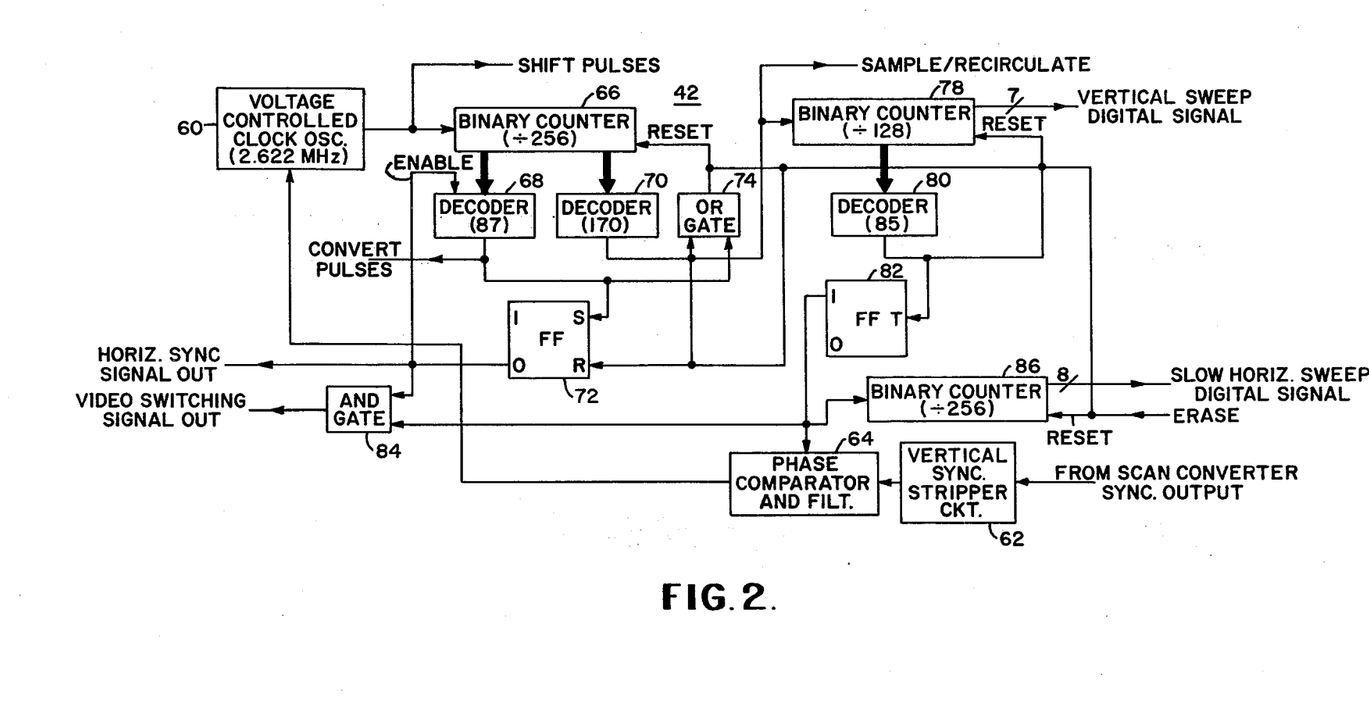
FIg. 2 is a block diagram of the timing and control signal generator used in the system shown in FIG. 1.

The timing and control signal generator 42 is illustrated in FIG. 2. A voltage controlled clock oscillator 60 provides clock pulses repetitive at 2.622MHz. These pulses are used directly as shift pulses for the shift registers of the recirculating memory 18 and provide the shift output of the timing and control signal generator. The clock oscillator 60 is phase locked to the frame sync output of the scan converter unit 36. A vertical sync stripper circuit 62 of the type conventionally used in television systems extracts the vertical sync pulses which are repetitive at 60 Hz. These sync pulses are applied to a phase comparator and filter circuit 64 and are compared therein in phase with 60 Hz pulses derived from the clock oscillator pulses. An error voltge is obtained from the phase comparator and filter circuit 64 and locks the oscillator 60 at a frequency of 2.622 MHz, in phase with the vertical sync pulses from the frame sync output of the scan converter unit 36. The clock oscillator 60 and the phase comparator and filter 64 may suitably be an integrated circuit phase locked oscillator device of the type which is commercially available. Alternatively, they may be fabricated from discrete circuit components in accordance with phase locked loop design techniques which are presently conventional.

Figure 3:
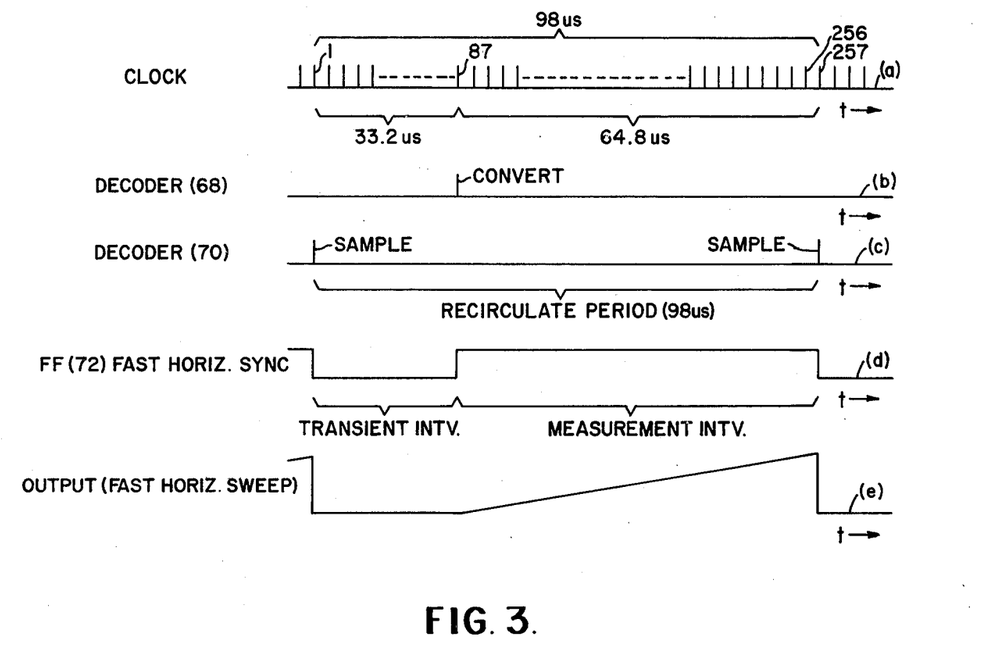
FIG. 3 is a series of waveforms which illustrates the operation of the system during the analysis of a segment thereof in one frequency range of one spectrum.

A counter 66 counts the clock pulses. This counter has the capacity to count a number of pulses at least equal to the bit length of the recirculating memory. The bit length of the memory is 256 bits. Thus, an eight-bit binary counter may suitably be used as a counter 66. 257 pulses are counted during the recirculating time of the memory, which is illustrated in waveform (a) of FIG. 3, is 98 us. The convert pulses (viz., the convert output of the timing and control signal generator 42) are obtained by a decoder 68 which may include gates connected to the counter 66 which are enabled to provide an output pulse when the counter counts 87 clock pulses and upon the 87th of these pulses.

Another decoder 70 which may also consist of gates connected to the stages of the counter 66 detects when 170 pulses are counted by the counter and provides an output on the 170th pulse. The sample pulse is provided by the decoder 170. This pulse is applied to the sampling gates of the recirculating memory and enables these gates to pass a sample digital signal from the SHADC to the memory 18. Otherwise, these sampling gates are inhibited and the memory recirculates at the shift pulse rate (2.622 MHz). The convert pulse from the decoder 68 is illustrated in waveform (b) and the sample pulses and their intervening recirculation period of 98 us is illustrated in waveform (c) also in FIG. 3.

A flip-flop latch 72 and an OR gate 74 which is connected to the reset input of the counter 66 establish the transient interval and measurement interval or time segment during which each frequency of each spectrum is analyzed. The flip-flop 72 also produces the horizontal sync signal at its "0" output.

Initially, the entire system is reset. This may be accomplished automatically whenever the erase control of the scan converter unit is operated; the scan converter providing an erase level which resets the flip-flop 72, the counter 66, as well as the other counters in the system. With the flip-flop 72 reset, an enable input is applied to the gates of the decoder 68. When 87 clock pulses are counted by the counter 66 the convert pulse is outputted by the decoder 68. This convert pulse also is applied to the set input of the flip-flop 72 and to the reset input of the counter 66 by way of the OR gate 74. The flip-flop 72 is then set and the counter 66 is reset back to zero. The decoder 68 is then inhibited by the "0" output of the flip-flop 72. The next ensuing 170 pulses occur. The decoder 70 then provides an output pulse which is used as the sample pulse upon occurrence of the 170th clock pulse which follows the 87th clock pulse. These pulses are illustrated in waveforms (a), (b) and (c) of FIG. 3.

The sample pulse from the decoder 70 again resets the counter 66 and also resets the flip-flop 72 so that the cycle may commence. The "0" output of the flip-flop 72 is illustrated in waveform (d) of FIG. 3. The duration of approximately 33.2 us from the first to the 87th clock pulse of the 257 pulses which constitute the 98 us of the recirculation time of the memory also constitute a transient interval. This is the interval after the sample pulse when the transient output of the B.P.F. 30 of the heterodyne detector is produced. It is desirable to suppress this transient output and this is done by the horizontal sync signal which is applied to the video switch 34. The horizontal sync signal is low during the transient interval and inhibits the switch so that the video input to the scan converter unit 36 is cut off during the transient interval. When the flip-flop is again reset, that is during the remaining approximately 64.8 us of the recirculation time of the memory 18, the flip-flop is reset and provides a positive output level over the measurement interval as shown in FIG. 3(d). It will be noted that this measurement interval repeats during successive time segments of the input signal, each corresponding to 170 clock pulse periods. The impulse response of the filter has decayed during the transient interval and the measurement interval contains the information as to the frequency and amplitude characteristics of the speech input signal without any distortion and nevertheless utilizing the entire bandwidth and broadband response of the filter 30.

It will be noted that a new sample of signal data from the SHADC is inputted to the memory once each recirculation time (viz., every 98 us or 257 clock pulse periods), 256 recirculations or an interval of approximately 25.1ms (viz., 98 us × 256) being required to enter a completely new signal lacking any redundancy, into the memory 18. This is the delay before a new interval spectrogram is displayed. Over a large number of recirculation times essentially the same information is available for read-out and is read out of the memory by the digital to analog converter 20.

In the illustrative system, during the interval of 85 successive recirculation times, 85 consecutive frequency ranges from approximately zero to approximately 5000 Hz in real time in approximately 60 Hz steps are analyzed. A counter 78 having the capacity to count to 85 is used for counting each of these 85 steps. A seven-bit binary counter which is capable of counting to 128 is therefore suitable as the counter 78, and is used in the illustrated system. The counter 78 is connected successively or in tandem with the counter 66. The decoder 70 provides the sample pulses which are counted in the counter 78. When the counter 78 counts 85 sample pulses, a decoder 80 which may consist of gates connected to the stages of the counter 76 provides an output pulse and thereupon resets the counter 78. When the 85th pulse is decoded by the decoder 80 a triggerable flip-flop 82 is triggered. The flip-flop divides by two and produces a square wave signal which is high for 85 sample pulses and low for the next 85 sample pulses. The operation of the counter 78, decoder 80, and triggerable flip-flop 82 may be observed from waveforms (a), (b) and (c) of FIG. 4. Waveform (a) is the same as waveform (d) of FIG. 3, but is drawn to a greatly expanded scale, and shows the horizontal sync pulses provided by the flip-flop 72. The sample pulse is concurrent with the trailing edge of the measurement interval. Thus, at the end of the 85th horizontal sync pulse cycle the square wave generator flip-flop 82 is triggered. Each recirculation of the memory 18 and each horizontal sync period (transient interval plus measurement interval) is 98 us in length. Eighty-five of such intervals has a duration of approximately 8.33ms. The period of the square wave is two of such 8.33ms intervals or approximately 16.67ms. This is a 60 Hz rate. The square wave produced by the flip-flop 82 is therefore repetitive at a 60 Hz rate which is identically the vertical sync period of the vertical frame sync pulses from the scan converter 36. Accordingly, by comparing the scan converter frame sync pulses with the square wave from the flip-flop 82 and the phase comparator and filter 64, error signals are obtained for locking the oscillator 60 in synchronism with the scan converter unit.

The scan converter unit also has successive read and write intervals. By using one-half of the scan converter storage screen area, say from 25% above mid-screen to 25% below mid-screen, writing can be carried on in half a frame period of 8.33ms, while the entire screen can be read in the remaining 8.33ms. In order to enable reading and writing on the scan converter unit, a read/write input control button or switch (see FIG. 1) may be manually operated. Accordingly, new information is stored on the scan converter screen while the read/write control is operated. Thereafter and until the erase control is operated, the scan converter unit is continuously read out so that the video monitor displays the spectrogram both while the read/write control is operated so that the spectrogram can be observed during the speech utterance as the spectrogram is developing; the observation being made on the video monitor 38. Until the erase control is depressed, the video monitor continues to read out the spectrogram at least 15 minutes before picture deterioration is noticeable.

The square wave signal from the flip-flop 82 is used to derive the video switching signal for the video switch 34 when the scan converter unit is utilized. The flip-flop 82 is connected to an input of an AND gate 84 and enables the gate 84 to pass the horizontal sync signal during the write interval (viz., the 8.33ms when the flip-flop "1" is high). When the "1" output of the flip-flop is low, the video switch 34 is inhibited. Accordingly, the video input is written on the scan converter during the write interval and blanked during the read interval. The horizontal sync signal blanks the video input during each transient interval.

The horizontal sync signal (waveform (d) FIG. 3) is applied to the fast horizontal sweep generator 48 and generates the first horizontal sweep as shown in waveform (e) of FIG. 3. The sweep is a ramp which increases during the measurement interval and is repetitive each measurement interval. The vertical sweep is obtained from the binary counter 78. It will be recalled that the counter 78 is incremented at the end of each measurement interval. A seven-bit vertical sweep digital signal which increases in value is provided by the counter 78. This seven-bit signal is applied to the first digital to analog converter 46 of display control circuits 40 and produces a step waveform as illustrated in waveform (c) of FIG. 4. This waveform increases incrementally in 85 steps, one for each recirculation time of the memory (viz., every 98 us). After the 85th recirculation time (viz., at the expiration of 8.33ms), the counter 78 is reset and another repetition of the staircase vertical sweep waveform occurs. Eighty-five steps or frequency ranges constitute a spectrum. The first spectrum of 85 steps occurs synchronously with the first staircase wave from the digital to analog converter 46. The second spectrum requires the next 85 steps. It is only until the 256th step that completely new non-redundant data is inputted to the recirculating memory 18. It will be noted that the last step of the first spectrum (corresponding to the frequency range of about 5 KHz) is followed immediately by the step corresponding to the frequency range of about 0 Hz. But the second spectrum is only the 86th recirculation and is not completed until the 170th recirculation. Accordingly, information in successive spectrums for the same frequency range will be redundant. since the intensity of the video signal is portrayed in each frequency range and plotted on side-by-side spectrums (interval spectrograms) based upon redundant information, continuity over the interval junction (the junctions between successive intervals is preserved) and the spectrogram portrays spectral variations both in the frequency and time dimensions or domains, frequency being plotted vertically and time horizontally. Repetitive characteristics such as pitch, variations of the formant of the speech utterances are therefore preserved and plotted in terms of the intensity variations, both in the frequency dimension and in the time dimension. The viewer can therefore look for fine detail or average the intensity by eye so as to obtain the spectral characteristics and features of interest to him.

Another binary counter 86 which is connected successively to the binary counter 78 provides the slow horizontal sweep digital signal. This counter may suitably be a binary counter having eight stages which is capable of counting to 256. Input to this binary counter, when the scan converter unit 36 is used, is obtained from the flip-flop 82. A pulse is then applied and counted by the counter 86 every 16.67ms which provides a total time of approximately 4.26 seconds (16.67ms × 256).

Figure 4:
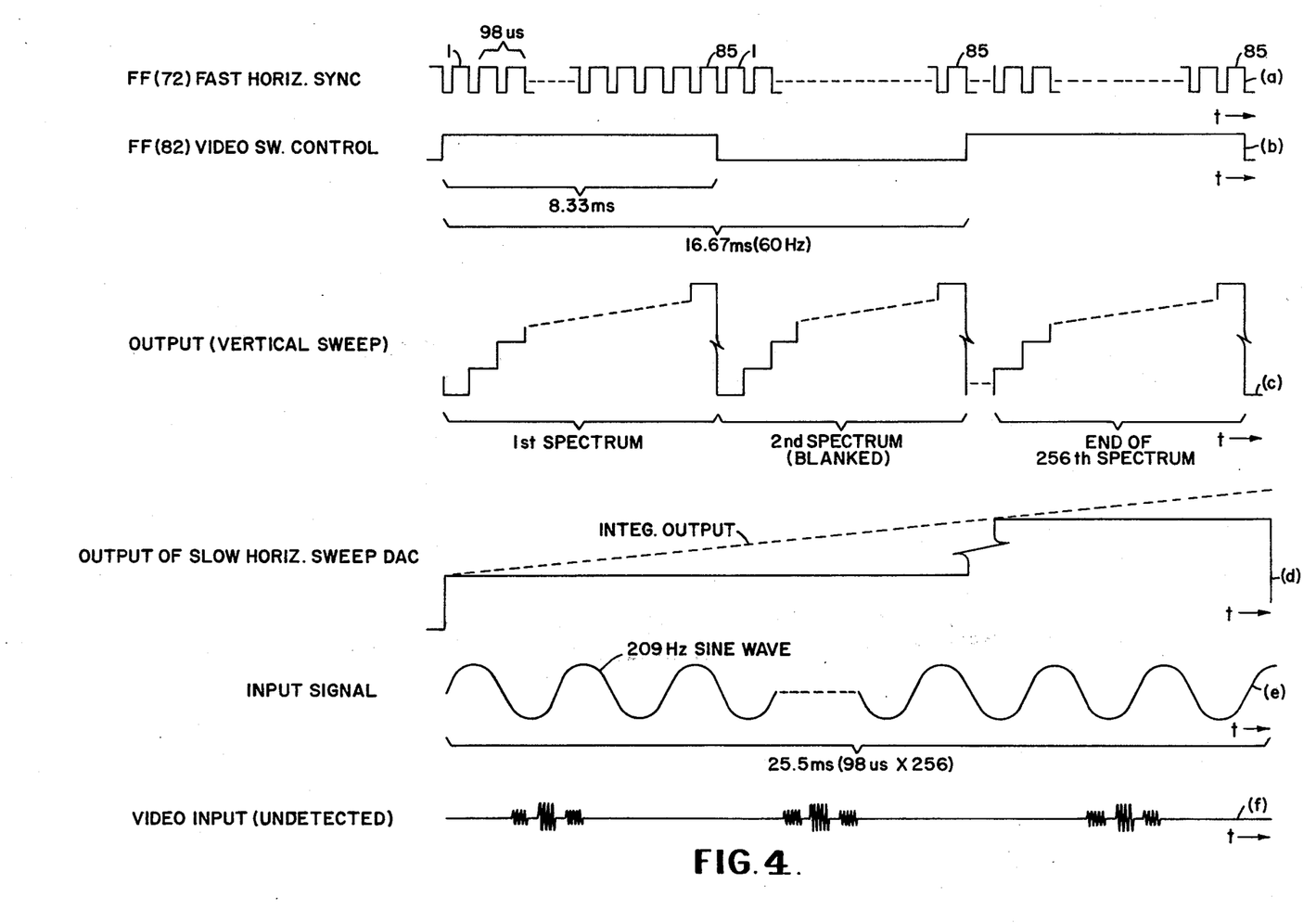
FIG. 4 is a waveform diagram on a much greatly expanded scale than the diagram shown in FIG. 3, the diagram showing the operation of the system illustrated in FIGS. 1 and 2 in analyzing the spectrums which are used to make up a spectrograph of an interval of the input signal approximately 25.5 ms in duration.

The counter 86 outputs an eight-bit slow horizontal sweep digital signal which is incremented at the end of alternate repetitions of vertical sweep signal (every 170 recirculations of the memory). Waveform (d) of FIg. 4 illustrates the output of the second digital to analog converter 52 in response to the slow horizontal sweep digital signal from the counter 86. Note that the converter 52 provides a staircase waveform, with each step having a length equal to two spectrums (interval spectrograms). These staircase waveforms from the digital to analog converter 52, if the integrator 54 is used, becomes a ramp, which increases with each step and then repeats every 256 steps. The combined horizontal sweep signal is the sum of the fast and slow sweep signals.

Together with the vertical sweep signals, the horizontal sweep make up a raster which is operative to write on the scan converter storage screen during the 8.33ms write interval, over which a spectrum is plotted and is read out on the video monitor over a 8.33ms interval.

Figure 5:
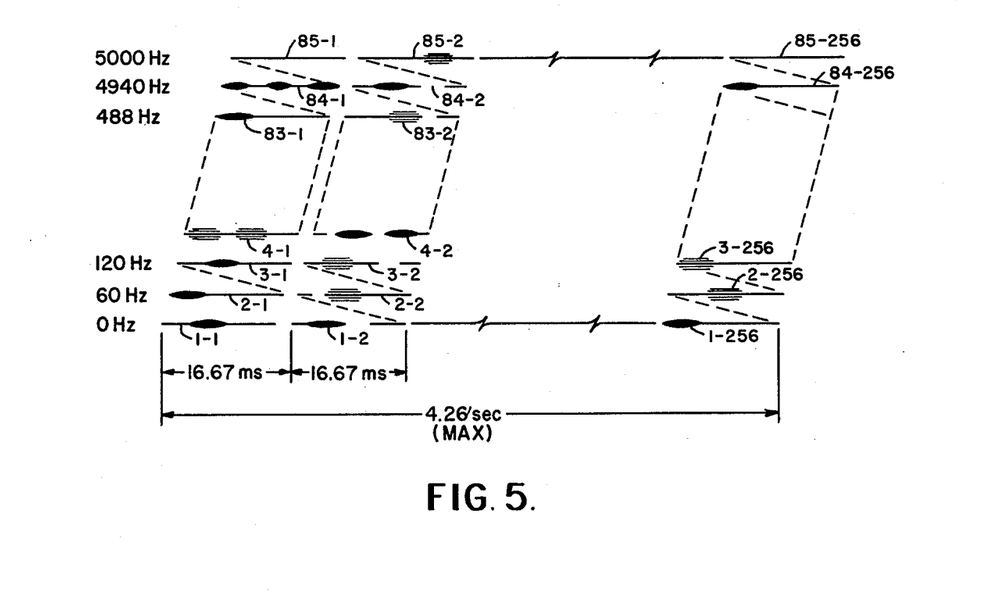
FIG. 5 illustrates a spectrogram of the speech signal as displayed on the video monitor of the system shown in FIG. 1, only the first, second and last spectrums which make up the spectrogram being shown to simplify the illustration.

This is a 60 Hz rate which provides a flicker-free display of each interval spectrogram. The plot is illustrated in FIG. 5.

Consider that the integrator 54 is not used and that the slow horizontal sweep is the staircase as illustrated in FIG. 4, waveform (d). During each measurement interval a successive frequency range of the spectrum is plotted over the raster provided by 85 consecutive fast horizontal sweep signals and 85 steps of the staircase of the first vertical sweep signal. The amplitude $V_{Hs}$ of the slow horizontal sweep is approximately equal to the amplitude of each step of the fast horizontal sweep signal $V_{Hf}$. The distance over which each frequency range is scanned along the X axis or in the horizontal direction during the measurement interval (64.8us) is therefore equal to the deflection resulting from the slow horizontal sweep in 16.67ms. Accordingly, successive spectrums (interval spectrograms) are plotted adjacent to each other with little or no gap therebetween. The successive spectrums are shown tilted to illustrate the effect of the sawtooth ramp slow sweep which would be produced if the integrator 54 was utilized. The intensity or energy distribution in a given frequency range is displayed as the brightness modulation on the screen of the monitor and is shown in FIG. 5 by thickened sections of each trace. The dash lines between the traces in each of the frequency range represents the retrace at the end of the ramp of the fast horizontal sweep waveform.

The redundancy both in frequency and time dimensions is illustrated in waveforms (e) and (f) of FIG. 4. Waveform (e) is a sine wave as may be produced by a tone having a frequency, say, of approximately 209 Hz. Consider that the frequency ranges are 60 Hz apart, a 209 Hz input signal will appear in three successive frequency ranges, since the ranges overlap and also since redundant information is contained in this recirculating memory or at least 256 recirculations or 25.5ms. Waveform 4(f) illustrates the video input to the scan converter and shows how the intensity of the video input changes but nevertheless is portrayed in each of three successive frequency ranges where the bandpass filter 30 passes the 209 Hz component. Each of the frequency range scans will be of constant amplitude but the amplitudes will be different in the case of a pure tone or sine wave which exists during the entire measurement interval. However, for speech and other complex waves, the intensity on the display varies during the measurement interval and will be portrayed as brightness modulation shown by the thick and thin areas of the spectral lines in FIG. 5.

From the foregoing description it will be apparent that there has been provided improved spectral analysis and display apparatus which affords real time sound spectrographs of speech and other complex signals. Variations and modifications in the system will undoubtedly suggest themselves to those skilled in the art. For example, fewer or greater numbers of frequency steps in the vertical sweep may be achieved, even during each 16.67ms field of the raster. A logarithmic or non-linear frequency scale can be implemented by transforming the vertical staircase waveform to the selected scale and using the transformed vertical staircase waveform to control the frequency of the VCO 26. The bandpass filter can be altered in bandwidth or shape factor to emphasize certain speech characteristics. The transient interval and measurement interval can be altered so long as the impulse response of the bandpass filter decays sufficiently during the transient interval. The video input signal can also be displayed on a logarithmic or other non-linear scale by interposing non-linear circuits, such as a diode compressor circuit between the output of the heterodyne detector and the video switch. Other and additional variations and modifications within the scope of the invention will no doubt also suggest themselves to those skilled in the art. Accordingly, the foregoing description should be taken merely as illustrative and not in any limiting sense.

I claim

1. In a frequency spectrum analyzer having means for repetitively providing a plurality of successive signals, each corresponding to the energy in a different frequency range of a successive frequency spectrum of an input signal to be analyzed, apparatus for providing a real time spectrogram of said input signal consisting of a plurality of interval spectrograms each for a different one of said successive frequency spectrums, which spectrogram displays variations with respect to time in the energy thereof in each of said different frequency ranges, said apparatus comprising:

means for generating a plurality of display control signals which are repetitive, the first of said plurality of control signals being repetitive at a rate corresponding to the repetition rate of said successive signals, the second of said plurality of control signals being repetitive at a rate corresponding to the repetition rate of said plurality of successive signals and having a period equal to the period of each of said interval spectrograms of a submultiple thereof, the third of said plurality of control signals being repetitive at a rate of a plurality of said successive spectrums, and means operated by said control signals for visibly displaying said successive signals along a raster which is defined in one direction by said first and third control signals and in a second direction, transverse to said first direction, by said second control signals whereby to produce a plurality of concatenated interval spectrograms which display the spectrogram of the input signal in real time.

2. The invention as set forth in claim 1 wherein said analyzer includes timing signal generating means for producing first timing signals concurrently with each of said successive signals, said display control signal generating means including:

a. first sweep generator means operated by said first timing signals to produce, as said first control signals, first sweep signals concurrently with said first timing signals;

b. second sweep generator means operated by said timing signals generating means after occurrence of a plurality of said first timing signals equal in number to the plurality of said successive signals which constitute an interval spectrogram for producing, as said second control signals, second sweep signals, and c. third sweep generator means operated by said timing signal generating means after occurrence of a plurality of said pluralities of said first timing signals for producing, as said third control signals, third sweep signals, and d. wherein said displaying means includes cathode ray tube means for providing said raster vertically in said second direction in response to said second sweep signals and horizontally in said first direction in response to said first and third sweep signals.

3. The invention as set forth in claim 2 including means for applying said second sweep signals to said cathode ray tube means to provide vertical deflection, means for applying the sum of said first and third sweep signals to said cathode ray tube means to provide horizontal deflection, said vertical and horizontal deflection providing said raster, and means operated by said first timing signals for applying said successive signals to said cathode ray tube means during said first timing signal to control the intensity of the display.

4. The invention as set forth in claim 3 wherein said cathode ray tube means consists of a scan converter unit and a video monitor operated by said scan converter unit, said scan converter unit having fast and slow deflection inputs for storage of signals in vertical and horizontally displaced locations therein, said fast and slow deflection inputs being connected respectively to said means for applying the sum of said first and third sweep signals and to said means for applying said second sweep signals, and said scan converter also having video input means connected to said means operated by said first timing signal for applying said successive signals.

5. The invention as set forth in claim 2 wherein said analyzer has time compression circuits including a recirculating memory for said input signal, said timing signal generator including a source of clock pulses for circulating said input signal through said memory upon occurrence of a certain number of said clock pulses, a first counter for counting said clock pulses and having capacity to count at least said certain number, means responsive to the count in said first counter for producing first and second timing pulses respectively when said counter counts said certain number of clock pulses and when said counter counts a number of clock pulses less than said certain number, means operated by said first and second timing pulses for providing as said timing signals, levels commencing with said second timing pulses and terminating with said first timing pulses, a second counter for counting said first timing pulses, means responsive to the count in said counter providing said second control signals each time said plurality of first timing pulses is counted, a third counter for counting said second control signals and providing said third control signals.

6. The invention as set forth in claim 5 wherein said analyzer also has a heterodyne detector, said apparatus including a first switch operated by said first timing signals for applying the output of said heterodyne detector to said cathode ray tube means only for the duration of said first timing signals to control the intensity of the display thereon whereby said display is blanked when said first timing signal is absent.

7. The invention as set forth in claim 6 wherein said cathode ray tube means consists of a scan converter unit and a video monitor, triggerable flip-flip means operated by said second timing signal for providing control signals synchronous with the write/read period of said converter unit, and means for combining said last-named control signal and said first timing signals and operating said switch therewith such that the video input to said converter unit from said heterodyne detector is blanked during the read periods of said converter unit.

8. Apparatus for producing a spectrogram of speech and the like input signals in real time which comprises a. means for compressing said input signals such that successive segments thereof containing redundant portions of said input signals occur repetitively for a given period of time, b. heterodyne detection means responsive to said successive segments of time compressed input signals from said compressing means for providing successive video signals which vary in amplitude for the interval of said segments in accordance with the energy in a plurality of successively higher frequency ranges over the frequency band of said input signals so as to provide successive interval spectrogram signals, c. visual display means responsive to said video signals for providing a frequency-time-intensity spectrograph pattern of said input signals as they occur consisting of concatenated interval spectrograms, and d. display control means for generating a plurality of sweep signals synchronously with said segments to form a raster on said display means for displaying said interval spectrograms so as to provide a flicker free display commencing without appreciable interval delay, including means for generating fast horizontal sweep signals, each concurrent with and of the same duration as a successive one of said segments, means for generating vertical sweep signals, each concurrent with and over the same interval as a plurality of said successive segments equal in number to said plurality of frequency ranges, means for generating slow horizontal sweep signals each concurrent with and over the interval as occupied by a plurality of successive ones of said vertical sweep signals, and means for applying said vertical sweep signals and the sum of said horizontal sweep signals to said visual display means.

9. The invention as set forth in claim 8 wherein said display means comprises cathode ray tube means having intensity control inputs for said video signal and vertical and horizontal sweep inputs for said vertical and horizontal sweep signals.

10. The invention as set forth in claim 9 wherein said cathode ray tube means includes a scan converter and a video monitor coupled to said converter for receiving the composite video output signal therefrom, said intensity input being said scan converter video input, and said vertical and horizontal sweep inputs respectively, being the slow and fast deflection inputs of said converter.

11. The invention as set forth in either claim 9 including a switch means connected between the outputs of said heterodyne means and said intensity inputs, and means for generating a control signal for enabling said switch means only during the intervals of said segments.

12. The invention as set forth in claim 8 further comprising timing and control signal generating means including a clock oscillator connected to said compressing means for establishing the factor by which said input signals are compressed in time, at least three counters, means for connecting said counters to each other in succession such that the first of said counters counts said clock and provides first and second pulses at the beginning and end of said segments respectively, said second counter counts said second pulses and provides a third pulse after counting a number of said second pulses equal to said plurality of frequency ranges to said third counter, and means for applying said first and second pulses to said fast horizontal sweep generating means, the output of said second counter to said vertical sweep generating means and the output of said third counter to said slow horizontal sweep generating means.

13. The invention as set forth in claim 12 wherein said heterodyne detector includes a variable frequency oscillator, and means for applying said vertical sweep signal to said oscillator for changing the frequency thereof in synchronism with said segments.

14. The invention as set forth in claim 12 including switch means connected between said heterodyne detector means and said display means for enabling and inhibiting the application of said video signals thereto, means operated by said first and second pulses for providing a control signal level which enables said switch means in the interval between said first and second pulses and inhibits said switch means in the interval between said second and first pulses whereby to blank said display in the latter interval.

15. The invention as set forth in claim 14 wherein said vertical sweep generator includes a first digital to analog converter connected to said second counter for providing as a vertical sweep signal a staircase voltage which increases with increasing counts in said second counter, said fast horizontal sweep generator comprises circuit means for generating a ramp wave which increases in amplitude in the interval between said first and second pulses, and said slow horizontal sweep generator includes a second digital to analog converter connected to said third counter.

16. The invention as set forth in claim 15 wherein said visual display is a scan converter unit having a composite video signal output and a video monitor responsive to said composite video signal output for producing said spectrogram, said scan converter having a video input connected to said switch means and having slow and fast deflection inputs, means for applying said vertical sweep signals and the sum of said fast and slow horizontal sweep signals respectively to said slow and fast deflection inputs of said converter, means responsive to said third pulses for providing a square wave repetitive at the same rate as said third pulses, means connecting said square wave to said switch means for blanking said video signal during one half the period thereof, means for applying said square wave to said third counter such that said third counter is incremented synchronously with alternate ones of said third pulses, and means for controlling the amplitude of said slow horizontal sweep signals with respect to said fast horizontal sweep signals such that the rasters of successive interval spectrograms are written adjacent to each other in said scan converter.

* * * * *